(12) United States Patent
Nakao et al.

(10) Patent No.: US 7,505,384 B2
(45) Date of Patent: Mar. 17, 2009

(54) OPTICAL RECORDING AND REPRODUCING APPARATUS

(75) Inventors: Kenji Nakao, Gifu (JP); Noboru Mamiya, Mizuho (JP); Ken Hirose, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 527 days.

(21) Appl. No.: 11/044,564

(22) Filed: Jan. 28, 2005

(65) Prior Publication Data
US 2005/0169131 A1 Aug. 4, 2005

(30) Foreign Application Priority Data
Jan. 30, 2004 (JP) .............................. 2004-023893

(51) Int. Cl.
*G11B 5/09* (2006.01)
(52) U.S. Cl. .................... 369/47.5; 369/116; 369/275.3; 369/13.26
(58) Field of Classification Search ................ 369/47.5, 369/116, 13.26, 275.3
See application file for complete search history.

(56) References Cited

U.S. PATENT DOCUMENTS

| | | | | |
|---|---|---|---|---|
| 5,274,622 A | * | 12/1993 | Kono | 369/116 |
| 5,706,271 A | * | 1/1998 | Hashimoto | 369/53.37 |
| 5,742,566 A | * | 4/1998 | Imai | 369/13.54 |
| 5,818,807 A | * | 10/1998 | Kuroda et al. | 369/116 |
| 6,144,628 A | * | 11/2000 | Matsuura | 369/47.5 |
| 6,937,548 B2 | * | 8/2005 | Hsiao et al. | 369/47.53 |
| 7,196,995 B2 | * | 3/2007 | Ishitobi et al. | 369/53.21 |
| 2005/0018572 A1 | * | 1/2005 | Gushima et al. | 369/53.15 |
| 2005/0083802 A1 | * | 4/2005 | Akahoshi et al. | 369/47.5 |

FOREIGN PATENT DOCUMENTS

JP 7-311942 11/1995

(Continued)

OTHER PUBLICATIONS

Chinese Office Action issued in corresponding Chinese Patent Application No. CN 2005100061519, dated Apr. 7, 2006.
Japanese Office Action (with English translation) issued in Japanese Patent Application No. JP 2004-023893, dated Feb. 26, 2008.

(Continued)

*Primary Examiner*—Wayne R Young
*Assistant Examiner*—Linh T Nguyen
(74) *Attorney, Agent, or Firm*—McDermott Will & Emery LLP

(57) ABSTRACT

Laser power adjustment is performed using a power calibration area (PCA) until the PCA is used up. After the PCA is used up, an additional PCA is reserved at the next recording start position and laser power adjustment is performed using the additional PCA. When an additional PCA is reserved, the additional PCA exists between an information file recorded this time and the last one of information files recorded previously in terms of a physical format. However, information test-written into the additional PCA is not regarded as an information file and PMA information is generated only from the information file recorded this time by excluding the test-written information. As a result, a situation is obtained in which the additional PCA does not logically exist on the disk and there will never occur an inconvenient situation where the additional PCA is erroneously reproduced at the time of reproduction.

5 Claims, 9 Drawing Sheets

FOREIGN PATENT DOCUMENTS

| | | |
|---|---|---|
| JP | 9-63061 | 3/1997 |
| JP | 2002-175624 | 6/2002 |
| JP | 2002-175624 A | 6/2002 |
| JP | 2005-004952 | 1/2005 |

OTHER PUBLICATIONS

Japanese Office Action, with English Translation, issued in Japanese Patent Application No. JP 2004-23893 dated on Jul. 1, 2008.

* cited by examiner

OPTICAL RECORDING AND REPRODUCING APPARATUS

BACKGROUND OF THE INVENTION

1. Field of the Invention

The present invention relates to an optical recording and reproducing apparatus, which is particularly suitable for recording/reproducing information on/from a write-once-read-many (hereinafter, referred to as WORM) optical disk.

2. Description of the Related Art

Recording media (optical disks) currently in use are classified into three major types as follows: a read only type medium such as a CD-ROM or a DVD-ROM; a rewritable type medium such as a CD-RW or a DVD-RW; and a WORM medium such as a CD-R, a DVD-R, or a DVD+R. Although WORM media such as a CD-R, a DVD-R, and a DVD+R can each be recorded only one time, those media are popular as they are cheap in comparison with rewritable type media and also maintain high compatibility with read only type media such as a CD-ROM and a DVD-ROM.

A WORM medium has a power calibration area (PCA) for adjusting laser power, and normal recording/reproducing operation is performed after laser power is adjusted using the PCA. In this case, however, it is impossible to adjust laser power after the PCA is used up, then recording operation is not usually performed after the PCA is used up.

As described above, the recordable capacity of the conventional WORM media is significantly influenced by the usage state of its PCA. When recording onto the disk is performed frequently and therefore the usage frequency of the PCA increases, there occurs a situation where further recording onto the disk becomes impossible even though a large free capacity remains on the disk. This inconvenient situation will become a more serious problem with further increases in capacities of such WORM media in the future.

JP 2002-175624 A discloses a technique in which a laser power adjustment area (outer power calibration area) is provided in an outermost circumference portion of a WORM medium as well as an innermost circumference portion of it and the laser power is appropriately adjusted using the adjustment area as required. According to this technique, adjustment of laser power using the outer power calibration area other than ordinary PCA can be performed, whereby the medium usability is improved when compared with the above-mentioned cases.

However, even in the advancing technique, there also arises a problem in that recording operation is not performed after the outer power calibration area is used up as with the above-mentioned case, and therefore media usability reduces.

In addition, the WORM disk varies in recording sensitivity within its recording surface. When laser power adjustment is performed using the outer power calibration area, laser power may not be adjusted to an appropriate value. The recording layer of the disk is formed through application using a spin coat method in ordinary cases, so the characteristics of the recording layer change abruptly as a distance to an outer peripheral portion of the disk is reduced. Therefore, when laser power adjustment with respect to a recording position in an inner peripheral portion or a central portion of the disk is performed using the outer power calibration area, laser power determined through the laser power adjustment may greatly depart from an originally appropriate value.

SUMMARY OF THE INVENTION

It is therefore an object of the present invention to make it possible to simultaneously achieve the ensuring of reliability of recording data and an improvement of the usage efficiency of a medium by performing the addition of a new power adjustment area as appropriate. In addition, it is an object of the present invention to prevent a situation where an adverse effect is exerted on a reproduction operation even when the new power adjustment area is added.

In order to attain the objects described above, the optical recording and reproducing apparatus according to the present invention includes: additional area reservation means for reserving an additional area for laser power adjustment in an area other than a laser power adjustment area formatted in advance on an optical recording medium; laser power adjustment means for performing the laser power adjustment with reference to a state of recording and reproduction of predetermined information with respect to the laser power adjustment area or the additional area; and management information recording means for generating management information that manages the recording addresses of recording information files and recording the management information onto the recording medium. Here, when the laser power adjustment is performed using the additional area, the management information recording means generates the management information by logically deleting the additional area from a management file.

According to the present invention, the laser power adjustment is performed by reserving the additional area as appropriate aside from the laser power adjustment area. As a result, it becomes possible to perform the laser power adjustment effectively while increasing the usage efficiency of the medium. At this time, the additional area is logically deleted from the management file. As a result, there will never occur a situation where the additional area becomes a hindrance at the time of reproduction.

In this case, the additional area reservation means may reserve the additional area when the laser power adjustment area is used up by the laser power adjustment. With this structure, it becomes possible to perform information recording efficiently without leaving any portion of the laser power adjustment area unused.

Also, the additional area reservation means may compare a recording address and an address set in advance with each other and determine the necessity of the reservation of the additional area based on a result of the comparison. With this structure, even when the media varies in recording sensitivity within its recording surface, it becomes possible to set the laser power at an optimum value in accordance with a recording position.

Further, the additional area reservation means may reserve the additional area at a position following the last one of recording files already recorded on the recording medium. With this structure, it becomes possible to perform the laser power adjustment using an area immediately close to the next recording position. As a result, it becomes possible to set the laser power with a very high degree of precision.

Also, in addition to the means described above, the optical recording and reproducing apparatus according to the present invention may further include judgment means for judging whether a changing degree of a parameter expressing a recording environment with respect to a value of the parameter at the time of the laser power adjustment performed last time exceeds a predetermined threshold value, where when a result of the judgment by the judgment means is positive, the laser power adjustment means performs the laser power adjustment. With this structure, it becomes possible to minimize the frequency of the laser power adjustment, which makes it possible to effectively suppress the consumption of the laser power adjustment area or makes it possible to avoid the unnecessary reservation of the additional area. As a result, it becomes possible to minimize a recording capacity used to reserve the additional area, which makes it possible to effectively increase the usage efficiency of the recording area.

In this case, the judgment means may monitor a temperature in the recording and reproducing apparatus as a parameter expressing the recording environment. Recording characteristics are significantly influenced by the temperature. As a result, structuring the judgment means in this manner makes it possible to appropriately judge the necessity of the laser power adjustment.

BRIEF DESCRIPTION OF THE DRAWINGS

The above-mentioned and other objects and new characteristics of the present invention will be apparent more entirely when explanations of embodiments indicated below are read in conjunction with the accompanying drawings, in which.

DESCRIPTION OF PREFERRED EMBODIMENTS

Hereinafter, embodiments of the present invention will be described in detail with reference to the drawings. It is to be expressly understood, however, that the following embodiments are for the purpose of illustration only and are not intended to limit the scope of the present invention. Note that in the embodiments, the recording and reproducing apparatus for recording/reproducing information on the DVD-R is that which has been adapted for the present invention.

Figure 1:
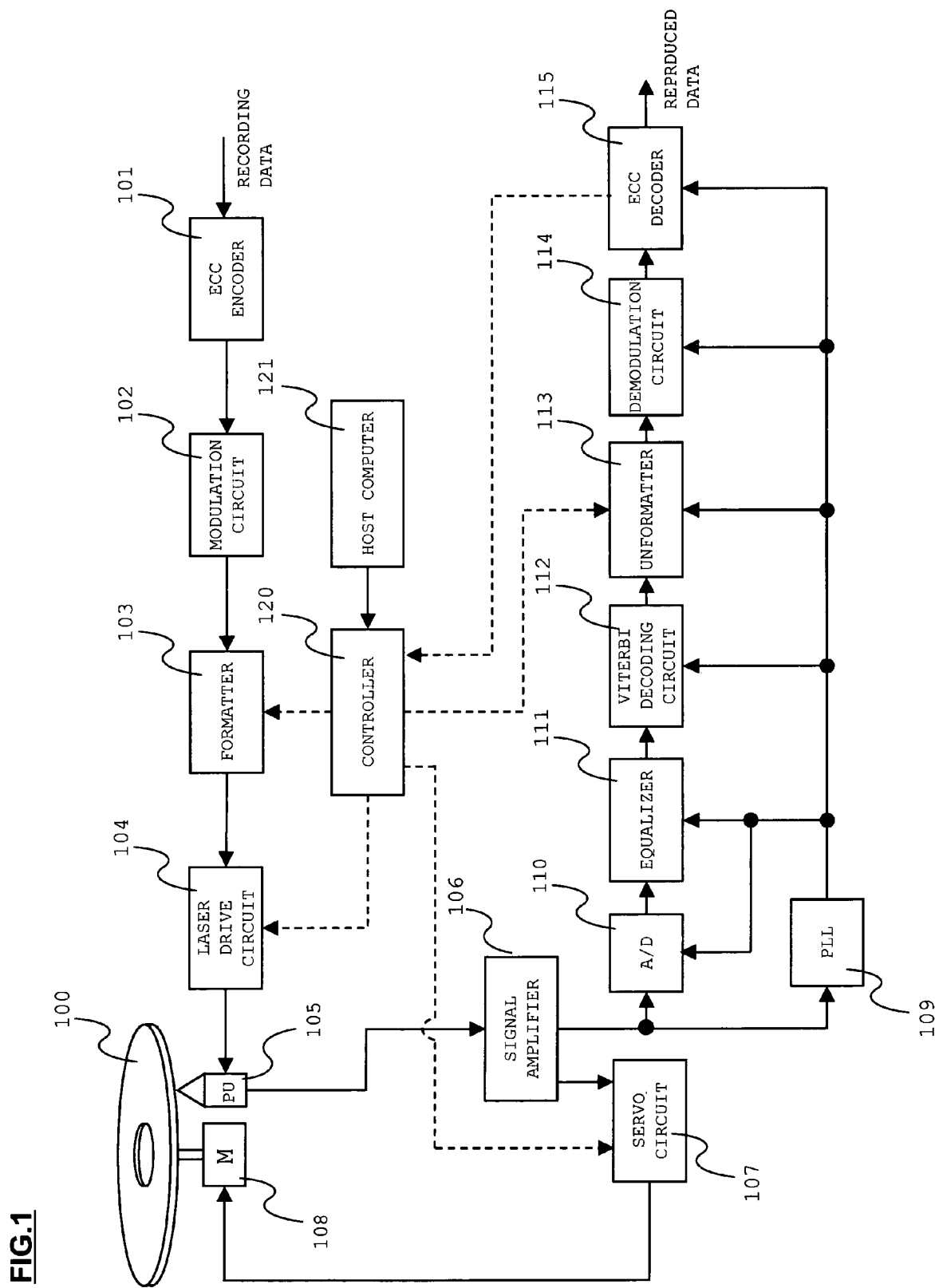
FIG. 1 shows a configuration of an optical recording and reproducing apparatus according to an embodiment of the present invention.

First, FIG. 1 shows a circuit block diagram of an optical recording and reproducing apparatus which records/reproduces information on/from a WORM disk. As shown in the figure, the recording and reproducing apparatus according to this embodiment includes an ECC encoder 101, a modulation circuit 102, a formatter 103, a laser drive circuit 104, an optical pickup 105, a signal amplifier 106, a servo circuit 107, a spindle motor 108, a PLL 109, an A/D conversion circuit 110, an equalizer 111, a Viterbi decoding circuit 112, an unformatter 113, a demodulation circuit 114, an ECC decoder 115, a controller 120, and a host computer 121. Note that, in FIG. 1, reference numeral 100 denotes a WORM optical disk (DVD-R).

The ECC encoder 101 adds an error correction code to the inputted recording data and outputs it to the modulation circuit 102. The modulation circuit 102 modulates the recording data and the error correction code by applying EFM modulation, EFMP modulation, or RLL (1, 7) modulation so that the shortest or longest data length of the recording data is restricted or lower frequencies are suppressed to reduce fluctuation of D.C. components. The formatter 103 processes the modulated recording data into a form complying with a physical format of a WORM disk based on a timing signal from the controller 120, and outputs it to the laser drive circuit 104. The laser drive circuit 104 controls the optical pickup 105 to emit a laser beam with optimum recording power for a WORM disk on the basis of the recording signal from the formatter 103.

The signal reproduced by the optical pickup 105 is amplified and calculated by the signal amplifier 106. The servo circuit 107 controls the rotation of the spindle motor 108, and the tracking mechanism and focusing mechanism of the optical pickup 105 on the basis of the signal from the signal amplifier 106. The PLL 109 generates clocks in synchronization with the reproduced data by means of the reproduced radio frequency (referred to as RF) signal from the signal amplifier 106, and outputs the clocks to each of the circuits. The A/D conversion circuit 110 converts the reproduced RF signal from an analog signal to digital data by sampling in synchronization with the clocks from the PLL 109. The equalizer 111 equalizes the digital data to a desired waveform and outputs it to the Viterbi decoding circuit 112. The Viterbi decoding circuit 112 selects the most reliable data column based on the calculated result of a Hamming distance and outputs binary data.

The unformatter 113 removes the data processed by the formatter 103 based on the timing signal from the controller 120 and samples user data and error correction code. The demodulation circuit 114 demodulates the data modulated by the modulation circuit 102 and outputs it to the ECC decoder 115. The ECC decoder 115 detects and corrects errors of the reproduced data by means of the error correction code and outputs the corrected reproduced data to the subsequent circuit. Note that the address data (logical address) reproduced by the ECC decoder 115 is supplied to the controller 120.

The controller 120 receives various kinds of commands related to recording and reproducing etc. from the host computer 121, and generates various kinds of timing signals or controlling signals to control each part. Note that the controller 120 adjusts the laser power as will be described below. The host computer 121 includes CPUs and MPUs and outputs various kinds of commands to the controller 120 in compliance with the input commands etc. from a user.

Next, a laser power adjusting process executed by the controller 120 will be described.

When adjusting the laser power, the controller 120 outputs the predetermined data to the formatter 103 to execute recording operation of the data. The controller 120 at this time outputs, for example, 1 ECC block data eight times, that is, a total of 8 ECC block data, to the formatter 103. While changing the laser power 1 ECC block each, a total of octuplicate data is recorded in the disk 100.

Note that a method of an area setting on the disk to be used in the recording will be described in detail later in accordance with any of embodiments 1 through 4

Next, the controller 120 executes reproducing operation of the recorded data. The reproduced data is outputted from the signal amplifier 106 to the ECC decoder 115 via the demodulation circuit 114. The ECC decoder 115 performs sequential processing on the reproduced data by 1 ECC block, and an error rate at this time is outputted to the controller 120. The controller 120 corresponds the error rate of the ECC decoder 115 with the octuplicate laser powers set in the recording, and detects the relationship between the laser power and the error rate.

Figure 2:
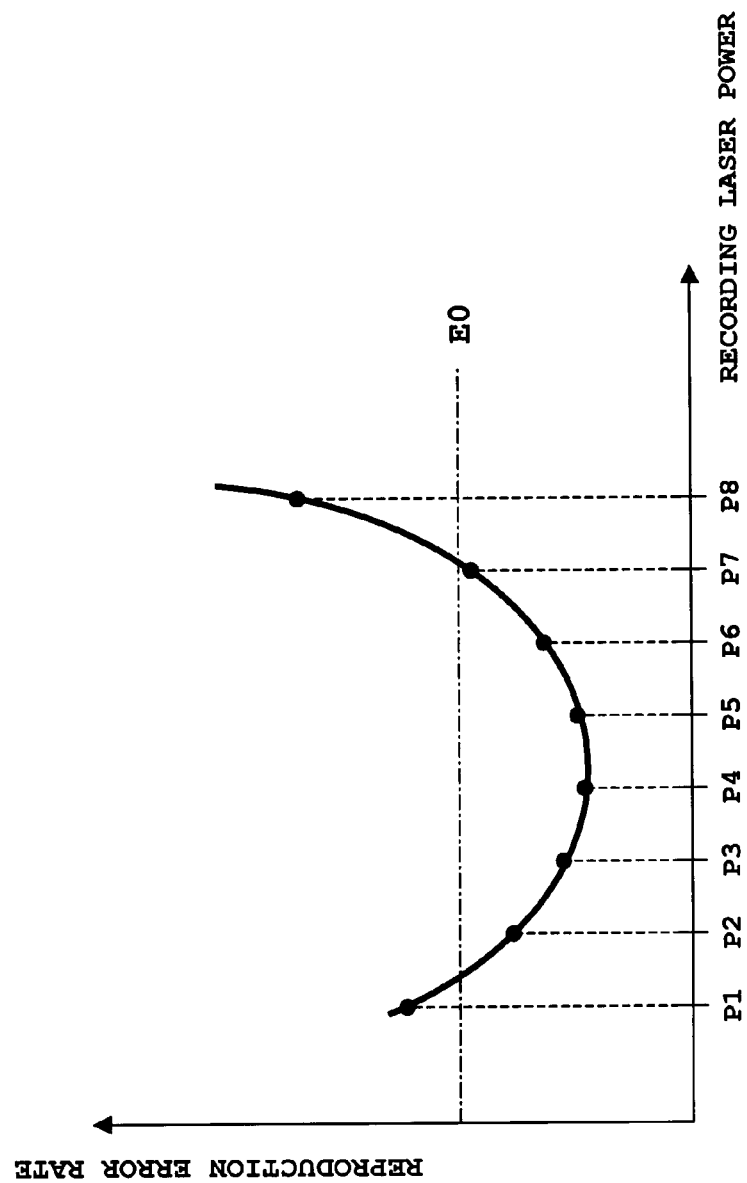
FIG. 2 is a diagram for explaining a laser power adjusting process according to the embodiment of the present invention.

FIG. 2 shows one example of the detected result at this time.

From the relationship between the detected laser power and the error rate, the controller 120 sets recording power whose error rate is lower than a threshold EO and is the lowest for example, as the optimum laser power. The subsequent recording operation is executed using the set laser power.

Note that methods for setting the optimum laser power are not limited to the above method, so various modifications may be available.

Figure 3:
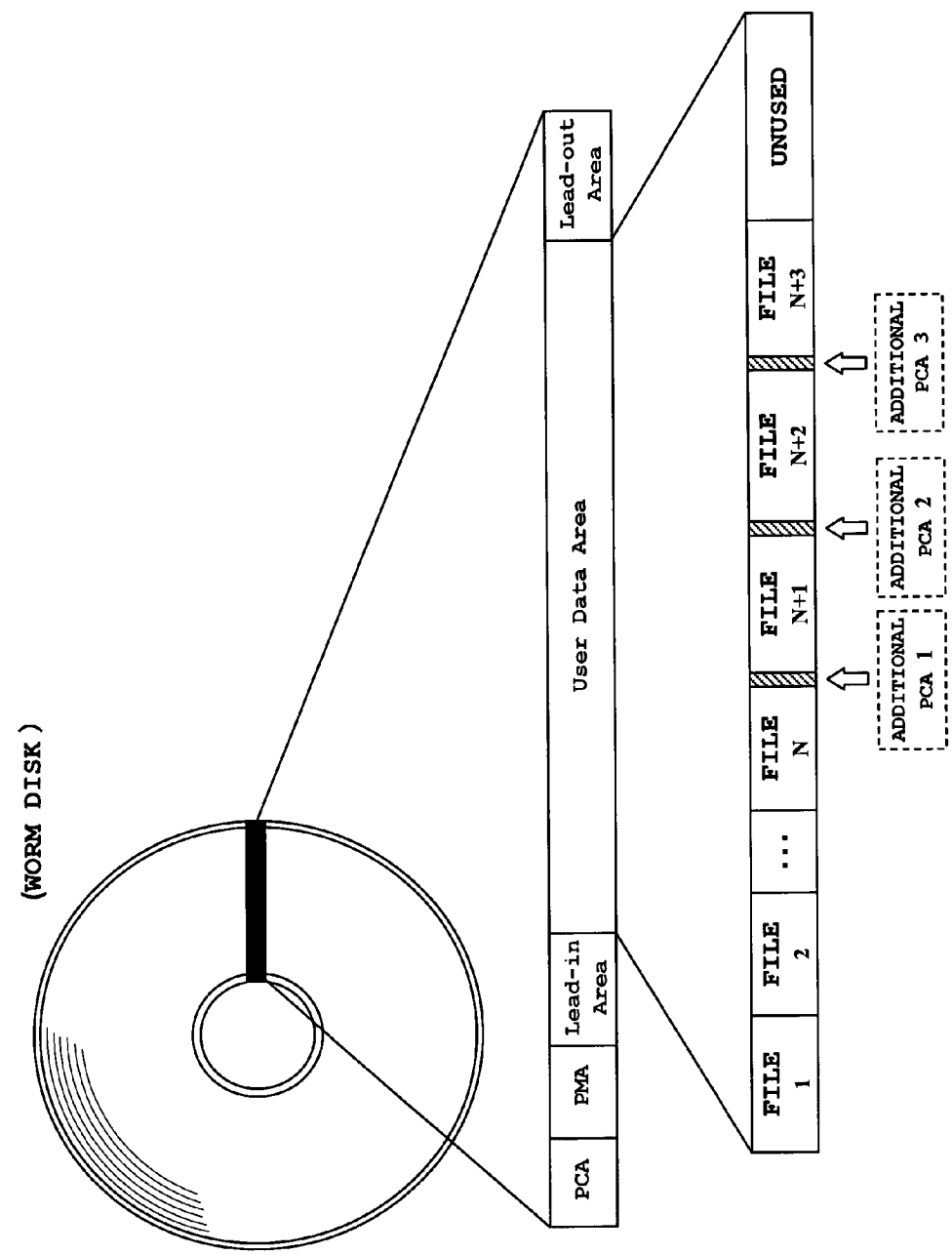
FIG. 3 shows a configuration of a WORM optical disk according to the embodiment of the present invention.

FIG. 3 shows a configuration of disk allocation for a WORM disk.

As shown in the figure, the WORM disk includes reservable recording areas having a lead-in area indicating the beginning of a user data area, the user data area as a recording area of user data, and a lead-out area indicating the termination of the user data area. In addition, the WORM disk includes a power calibration area (PCA) used for determining recorded or reproduced laser power, and a program memory area (PMA) recordable for information peculiar to the WORM disk such as a recording condition or file management information (recorded file starting address). The PCA and PMA are provided at positions prior to the lead-in area of the read only type disk.

In this embodiment, an additional laser power adjustment area (additional PCA) other than the PCA is reserved as appropriate. The above-mentioned laser power adjusting operation is executed using the PCA or the additional PCA. Note that, information on the PCA use state is recorded in a free area of the PMA.

Operation for adjusting laser power using a PCA or an additional PCA will be described subsequently.

First Embodiment

Figure 4:
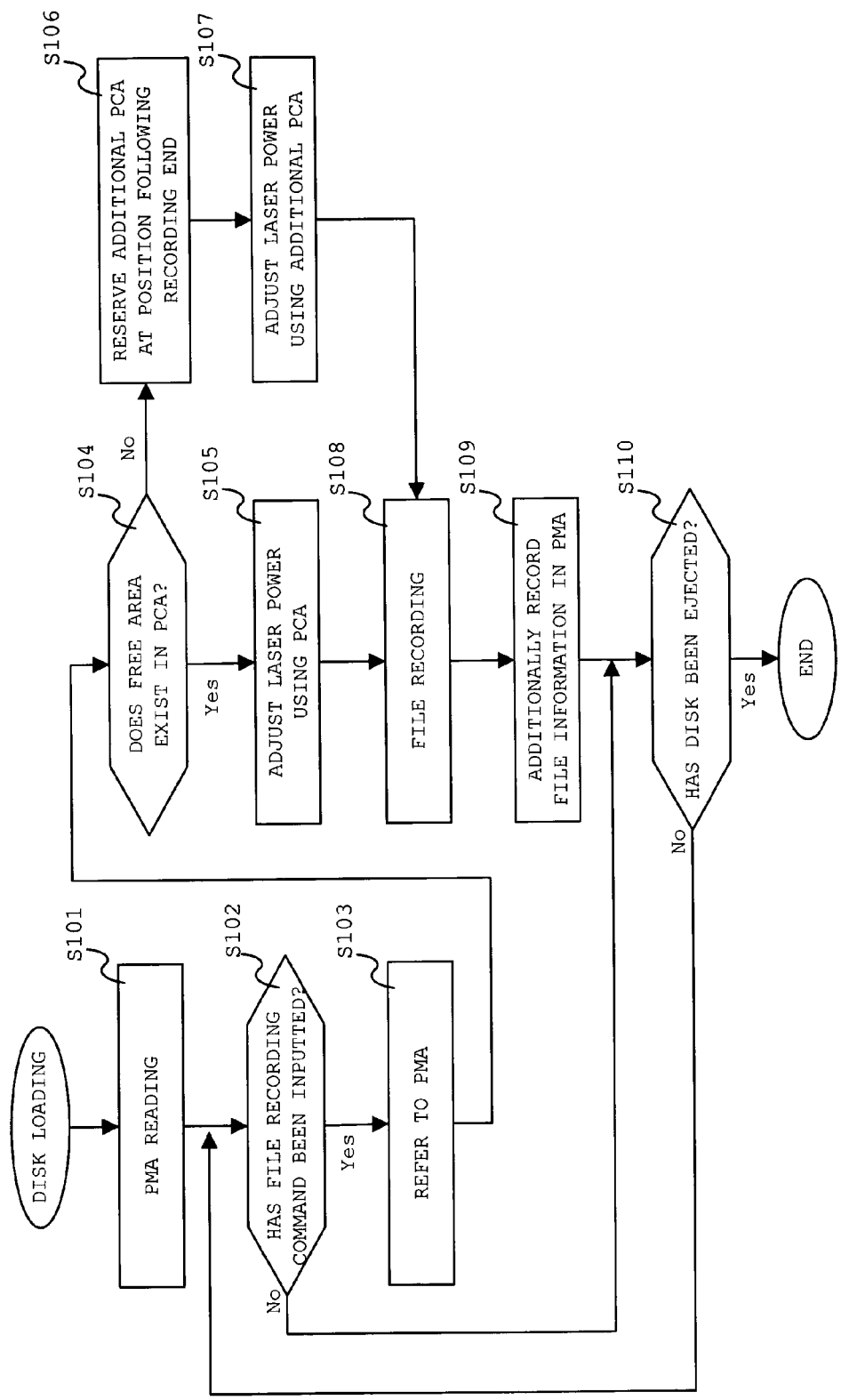
FIG. 4 is a flow chart of a laser power adjusting process in Embodiment 1 of the present invention.

FIG. 4 shows a flow chart of a laser power adjusting process in Embodiment 1 of the present invention.

When the WORM disk is loaded to the recording and reproducing apparatus, first, the controller 120 reads information from the PMA of the disk and stores the information in its internal memory (S101). Then, the controller 120 waits for a file information recording command to be inputted from the host computer 121 (S102).

Following this, when a file information recording command is inputted from the host computer 121 (S102: YES), the controller 120 refers to the PMA information stored in the internal memory (S103) and judges whether a free area remains in the PCA (S104). When a result of this judgment is positive (S104: YES), the controller 120 performs laser power adjustment by performing recording and reproduction with respect to the PCA in the manner described above (S105). On the other hand, when the judgment result is negative (S104: NO), the controller 120 reserves an additional PCA at a position (address) following the last one of files already recorded (S106) and performs the laser power adjustment by performing recording and reproduction with respect to the reserved additional PCA (S107). Note that the capacity of an area reserved as the additional PCA is set at the minimum capacity necessary for the laser power adjustment.

Then, after the laser power adjustment is performed, the controller 120 performs an information file recording operation by controlling the recording-related components from the ECC encoder 101 to the laser drive circuit 104 (S108). Here, when the additional PCA was reserved in S106 and S107 described above, the recording operation is performed with respect to an area following the last recording position (address) of test writing performed for the laser power adjustment. Following this, when the information file recording is ended, the controller 120 adds PMA information concerning an information file recorded this time to the PMA information stored in the internal memory and records resultant information in the PMA (S109).

It should be noted here that when the additional PCA was reserved in S106 and S107 described above, the additional PCA exists between the information file recorded this time and the last one of information files recorded previously in terms of the physical format of the disk. Therefore, the controller 120 does not regard information test-written into the additional PCA as an information file and generates the PMA information only from the information file recorded this time by excluding the test-written information. Consequently, a situation is obtained in which the additional PCA does not logically exist on the disk. As a result, there will never occur an inconvenient situation where the additional PCA is erroneously reproduced at the time of reproduction.

Following this, when the PMA information recording is finished, the controller 120 next judges whether the disk has been ejected from the recording and reproducing apparatus (S110). When a result of this judgment is negative, the processing returns to S102 and the controller 120 waits for the next file recording command to be inputted.

As described above, according to this embodiment of the present invention, when the PCA is used up, an additional PCA is reserved and laser power adjustment is performed using the additional PCA, so it becomes possible to perform information recording at optimum laser power without leaving a recording area unused. Also, the additional PCA is logically deleted from the PMA, so there will never occur a situation where the additional PCA becomes a hindrance at the time of reproduction.

Second Embodiment

In the first embodiment described above, when the PCA is used up, the additional PCA reservation is performed. In a second embodiment, however, even when the PCA is not used up, when the recording address of a new information file exceeds an address set in advance, an additional PCA is reserved and laser power adjustment is performed using the additional PCA.

Figure 5:
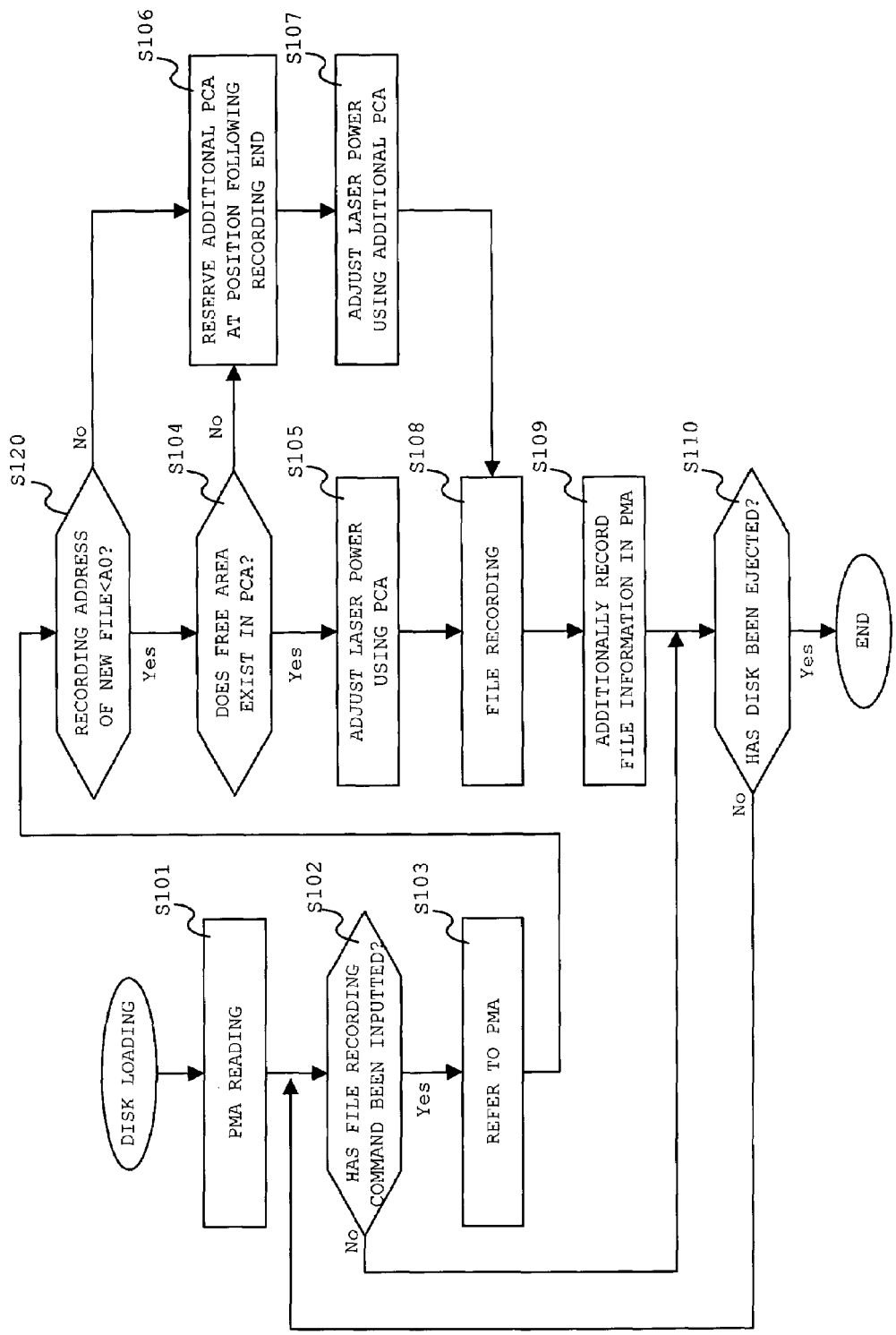
FIG. 5 is a flow chart of a laser power adjusting process in Embodiment 2 of the present invention.

FIG. 5 is a flowchart of the laser power adjustment performed in this embodiment.

This flowchart has a structure where S120 is newly added to the flowchart in FIG. 4 relating to the first embodiment described above. Operations in other steps are the same as those in the first embodiment.

In this embodiment, in S120, the controller 120 judges whether the recording address of a new information file exceeds an address A0 set in advance. Following this, when a result of this judgment is positive, the processing proceeds to S106 in which the controller 120 reserves an additional PCA. On the other hand, when the judgment result is negative, the processing proceeds to S104 in which the controller 120 judges whether a free area exists in the PCA. When a result of this judgment is positive (S104: YES), the laser power adjustment is performed using the PCA (S105). On the other hand, when the judgment result is negative (S104: NO), the controller 120 reserves an additional PCA (S106) and the laser power adjustment is performed using the additional PCA (S107).

It should be noted here that the address A0 is a position (address) on a recording track until which the characteristics of the recording layer is supposed to be relatively stable from a disk inner peripheral side. Such an address A0 is verified and set using an experimental or statistical technique.

According to this embodiment, similarly to the first embodiment described above, when the PCA is used up, an additional PCA is reserved and laser power adjustment is performed using the additional PCA, so it becomes possible to perform information recording at optimum laser power without leaving a recording area unused. Also, the additional PCA is logically deleted from the PMA, so there will never occur a situation where the additional PCA becomes a hindrance at the time of reproduction.

In addition, in this embodiment, when a recording position exceeds the address AO, that is, when the recording position reaches an area in which the recording characteristics are unstable, laser power adjustment is performed using an additional PCA reserved immediately close to the recording position instead of the PCA in the innermost peripheral portion. As a result, it becomes possible to set laser light at a more optimum laser power value as compared with the case of the first embodiment described above.

Third Embodiment

In a third embodiment, the first embodiment described above has been modified. That is, in the first embodiment described above, each time new information file recording is performed, laser power adjustment is carried out. In this embodiment, however, an in-apparatus recording environment is monitored and laser power adjustment is performed only when the recording environment has changed by a degree by which the change exerts an influence on recording characteristics.

Figure 6:
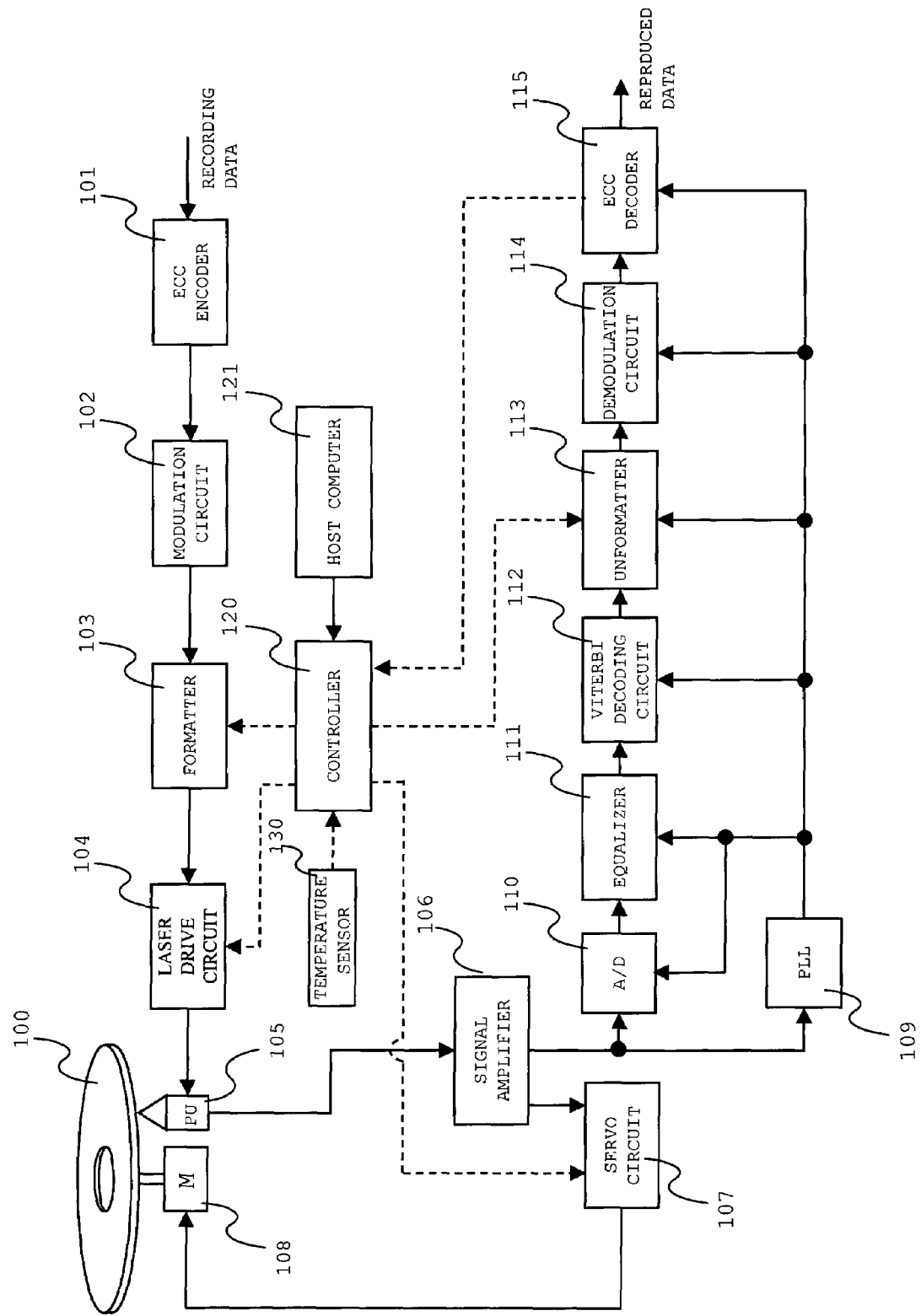
FIG. 6 shows a configuration of an optical recording and reproducing apparatus in Embodiment 3 of the present invention.

FIG. 6 shows a construction of a recording and reproducing apparatus in this embodiment. The recording and reproducing apparatus in this embodiment differs from the recording and reproducing apparatus described above in that a temperature sensor 130 that detects an in-apparatus temperature is additionally provided. Other structures are the same as those in the first embodiment described above (FIG. 1). Here, each time laser power adjustment is carried out, the controller 120 stores a temperature T detected by the temperature sensor 130 in its internal memory. With this structure, the controller 120 compares a difference ΔT between a temperature T detected at the time of laser power adjustment performed last time and a temperature T detected for current file information recording with a threshold value T0 set in advance, and carries out laser power adjustment only when ΔT exceeds the threshold value T0. Note that when ΔT does not exceed the threshold value T0, the current file information recording is performed using laser power set at the time of previous file information recording as it is.

Figure 7:
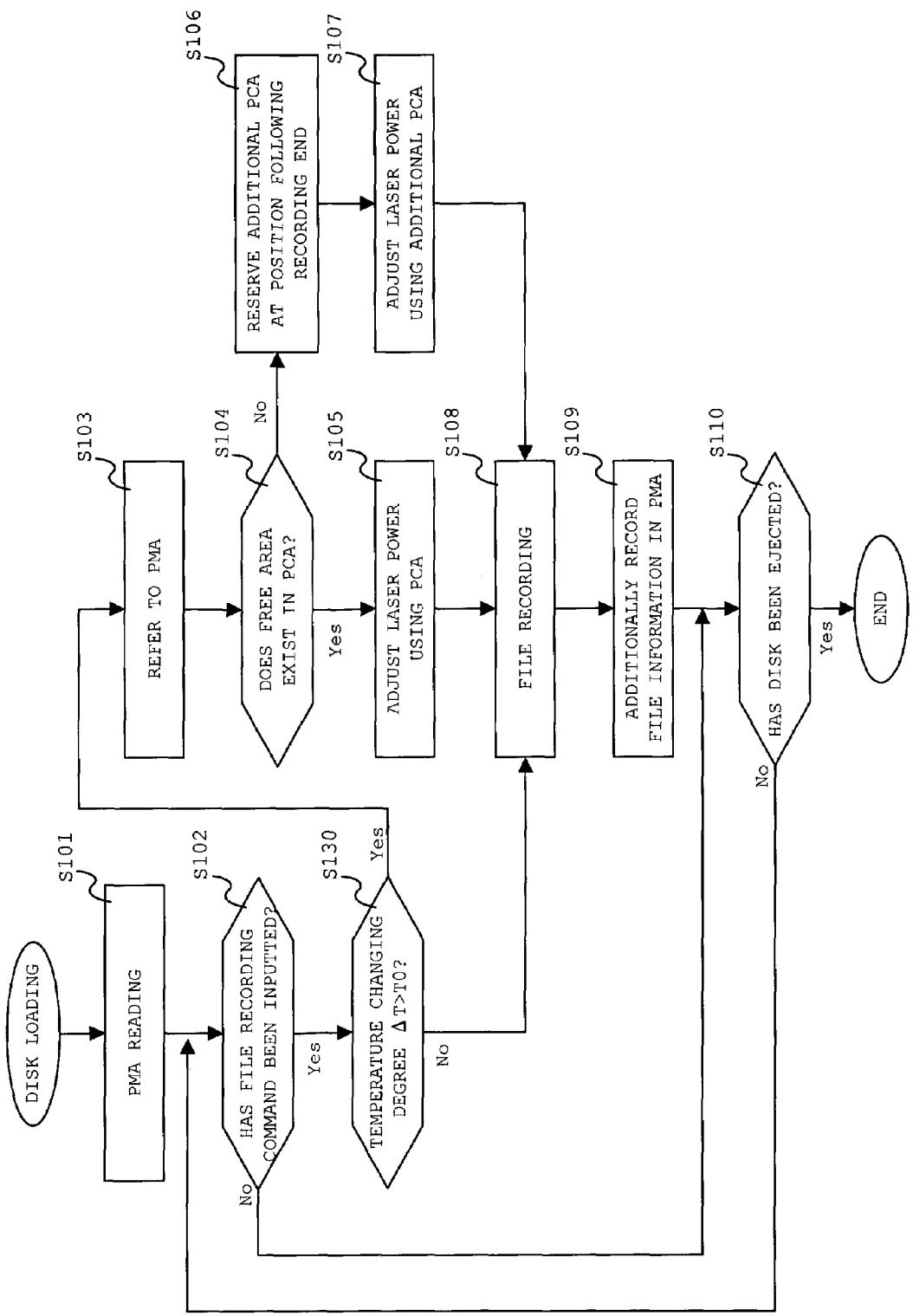
FIG. 7 is a flow chart of a laser power adjusting process in Embodiment 3 of the present invention.

FIG. 7 is a flowchart of the laser power adjustment performed in this embodiment.

This flowchart has a structure where S130 is newly added to the flowchart in FIG. 4 relating to the first embodiment described above. Operations in other steps are the same as those in the first embodiment.

In this embodiment, in S130, the controller 120 judges whether a temperature changing degree ΔT with respect to a temperature at the time of laser power adjustment performed last time exceeds the threshold value temperature T0 set in advance. Following this, when a result of this judgment is negative, the processing proceeds to S108 and file information recording is performed using laser power used until then as it is. On the other hand, when the judgment result is positive, the processing proceeds to S103 and the controller 120 performs additional PCA reservation in accordance with whether a free area remains in the PCA.

It should be noted here that the threshold value temperature T0 is a value relating to the in-apparatus temperature with reference to which it is judged whether the recording environment has changed by a degree by which the change exerts an influence on the recording characteristics. Such a threshold value temperature T0 is verified and set using an experimental or statistical technique.

According to this embodiment, similarly to the first embodiment described above, when the PCA is used up, an additional PCA is reserved and laser power adjustment is performed using the additional PCA, so it becomes possible to perform information recording at optimum laser power without leaving a recording area unused. Also, the additional PCA is logically deleted from the PMA, so there will never occur a situation where the additional PCA becomes a hindrance at the time of reproduction.

In addition, in this embodiment, laser power adjustment is performed only when the changing degree ΔT of the in-apparatus temperature T with respect to a temperature at the time of laser power adjustment performed last time exceeds the threshold value temperature T0, that is, only when the recording environment has changed with respect to a recording environment at the time of the laser power adjustment performed last time by a degree by which the change exerts an influence on the recording and reproduction characteristics. Therefore, it becomes possible to suppress the number of times of laser power adjustment to the required minimum number of times, thereby making it possible to suppress the unnecessary consumption of the PCA. As a result, as compared with the case of the first embodiment described above, it becomes possible to suppress the number of times of the additional PCA reservation due to the using up of the PCA, thereby making it possible to effectively suppress the decrease of a recording capacity due to the additional PCA reservation.

It should be noted here that in this embodiment, the in-apparatus temperature is used as the parameter expressing the changing of the recording environment, although another parameter may be used instead. Also, the laser power adjustment may be performed when an elapsed time T from laser power adjustment performed last time exceeds a threshold value T0.

Fourth Embodiment

In a fourth embodiment, the second embodiment described above has been modified. That is, in the second embodiment described above, each time recording of a new information file is performed, laser power adjustment is carried out. In this embodiment, however, like in the third embodiment described above, a recording environment in an apparatus is monitored and, only when the recording environment has changed by a degree by which the change exerts an influence on recording characteristics, laser power adjustment is performed.

Figure 8:
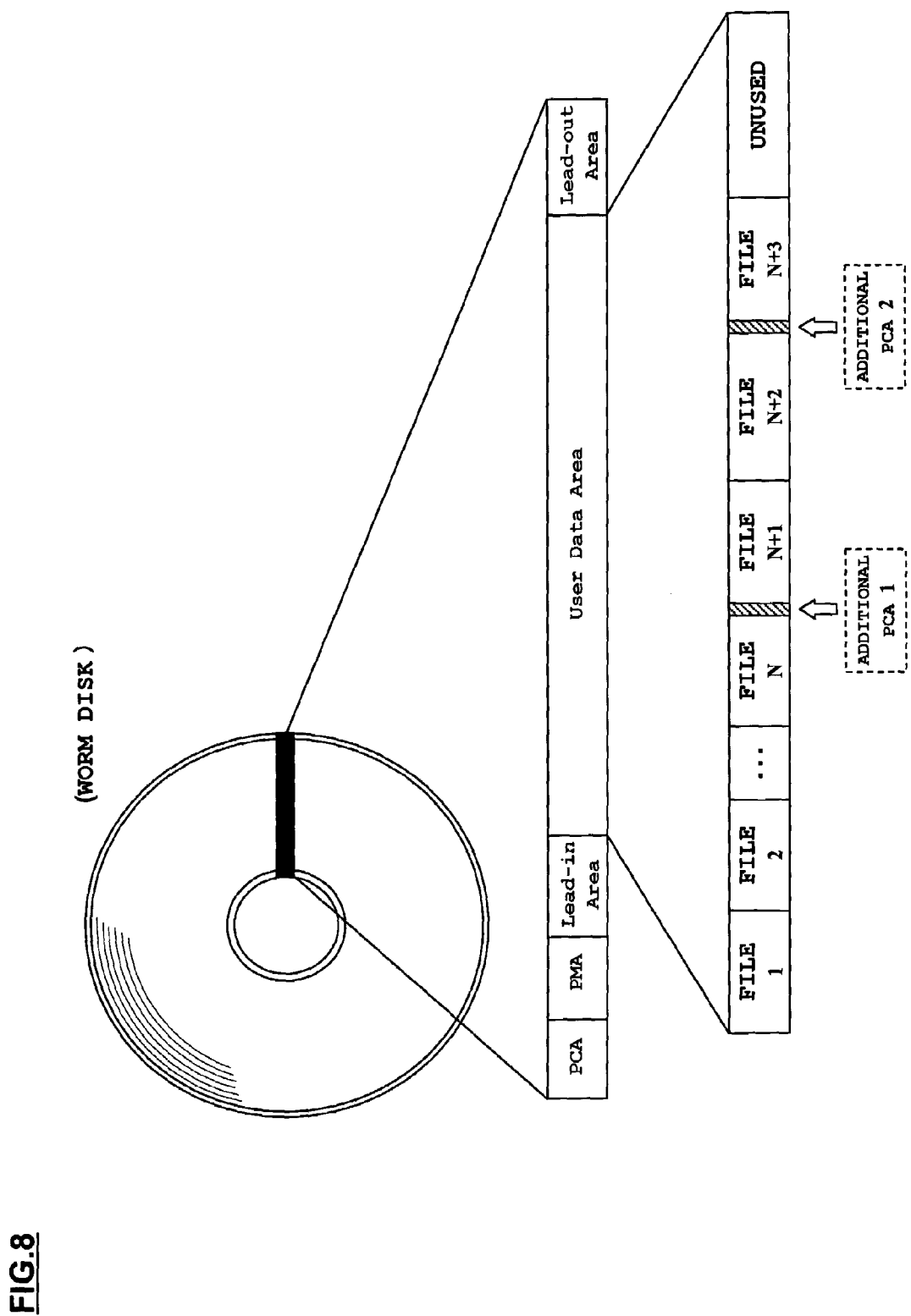
FIG. 8 shows a recording status of a WORM optical disk in Embodiment 4 of the present invention.

A structure of a recording and reproducing apparatus in this embodiment is the same as that shown in FIG. 6 relating to the third embodiment described above. Note that in the second embodiment described above, once a recording address has exceeded the threshold value address A0, each time a new file is recorded, an additional PCA is reserved. In this embodiment, however, as shown in FIG. 8, even after the threshold value address A0 is exceeded, when a temperature changing degree ΔT between an in-apparatus temperature detected at the time of laser power adjustment performed last time (at the time of recording of a file N+1 in FIG. 8, for instance) and an in-apparatus temperature detected for current file information recording (at the time of recording of a file N+2 in FIG. 8, for instance) does not exceed the threshold value temperature T0, no additional PCA is reserved and the file information recording is performed using laser power used until then as it is.

Figure 9:
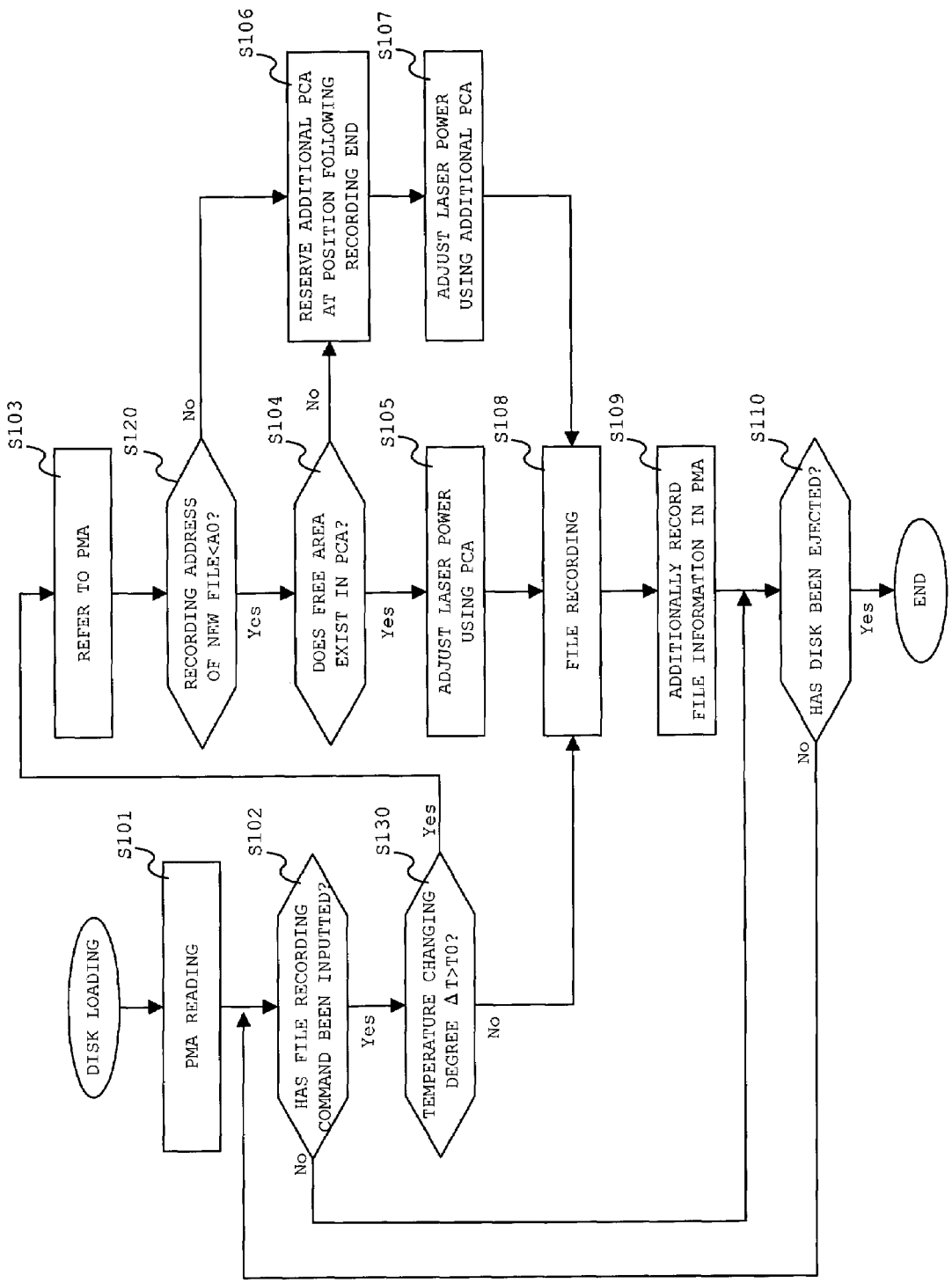
FIG. 9 is a flow chart of a laser power adjusting process in Embodiment 4.

FIG. 9 is a flowchart of the laser power adjustment performed in this embodiment.

This flowchart has a structure where S130 is newly added to the flowchart in FIG. 5 relating to the second embodiment described above. Operations in other steps are the same as those in the second embodiment described above (FIG. 5).

In this embodiment, in S130, the controller 120 judges whether a temperature changing degree ΔT with respect to a temperature at the time of laser power adjustment performed last time exceeds the threshold value temperature T0 set in advance. Following this, when a result of this judgment is negative, the processing proceeds to S108 and file information recording is performed using laser power used until then as it is. On the other hand, when the judgment result is positive, the processing proceeds to S103 and the controller 120 performs additional PCA reservation in accordance with whether recording position exceeds the address A0 or whether a free area remains in the PCA.

It should be noted here that the threshold value temperature T0, similarly to the third embodiment described above, is a value relating to the in-apparatus temperature with reference to which it is judged whether the recording environment has changed by a degree by which the change exerts an influence on the recording characteristics. Such a threshold value temperature T0 is verified and set using an experimental or statistical technique.

According to this embodiment, the same effect as in the second embodiment can be obtained.

In addition, in this embodiment, laser power adjustment is performed only when the changing degree ΔT of the in-apparatus temperature T with respect to a temperature at the time of laser power adjustment performed last time exceeds the threshold value temperature T0, that is, only when the recording environment has changed with respect to a recording environment at the time of the laser power adjustment performed last time by a degree by which the change exerts an influence on the recording and reproduction characteristics. Therefore, it becomes possible to suppress the number of times of laser power adjustment to the required minimum number of times, which makes it possible to suppress the unnecessary consumption of the PCA and the unnecessary additional PCA reservation. As a result, as compared with the case of the second embodiment described above, it becomes possible to suppress the number of times of the additional PCA reservation due to the using up of the PCA and the unnecessary additional PCA reservation in an area which exceeds the address A0, thereby making it possible to effectively suppress the decrease of a recording capacity due to the additional PCA reservation.

It should be noted here that in this embodiment, similarly to the third embodiment described above, a parameter other than the in-apparatus temperature is used as the parameter expressing the changing of the recording environment. Also, the laser power adjustment may be performed when an elapsed time T from laser power adjustment performed last time exceeds a threshold value T0.

As described above, the present invention is not limited to the embodiments described above and it is possible to make various changes. It is possible to make various changes to the embodiment of the present invention as appropriate without departing from the scope of the technical idea described in the appended claims.

What is claimed is:

1. An optical recording and reproducing apparatus for recording/reproducing information on/from a write-once-read-many optical recording medium, comprising:

additional area reservation means for reserving an additional area for laser power adjustment in an area other than a laser power adjustment area formatted in advance on the optical recording medium;

laser power adjustment means for performing the laser power adjustment with reference to a state of recording and reproduction of predetermined information with respect to one of the laser power adjustment area and the additional area; and management information recording means for generating management information that manages recording addresses of recording information files and recording the management information onto the recording medium, and judgment means for judging whether a changing degree of a parameter expressing a recording environment with respect to a value of the parameter at a time of the laser power adjustment performed last time exceeds a predetermined threshold value, wherein the additional area for laser power adjustment is added into a user data area, wherein when the laser power adjustment is performed using the additional area, the management information recording means generates the management information by logically deleting the additional area from a management file, and wherein when a result of the judgment by the judgment means is positive, the laser power adjustment means performs the laser power adjustment.

2. An optical recording and reproducing apparatus according to claim 1, wherein the additional area reservation means reserves the additional area when the laser power adjustment area formatted in advance on the optical recording medium is used up by the laser power adjustment.

3. An optical recording and reproducing apparatus according to claim 1, wherein the additional area reservation means compares a recording address and an address set in advance with each other and determines necessity of the reservation of the additional area based on a result of the comparison.

4. An optical recording and reproducing apparatus according to claim 1, wherein the additional area reservation means reserves the additional area at a position following the last one of recording files already recorded on the recording medium.

5. An optical recording and reproducing apparatus according to claim 1, wherein the judgment means monitors a temperature in the recording and reproducing apparatus as one of the parameters expressing the recording environment.

* * * * *